UNITED STATES PATENT OFFICE.

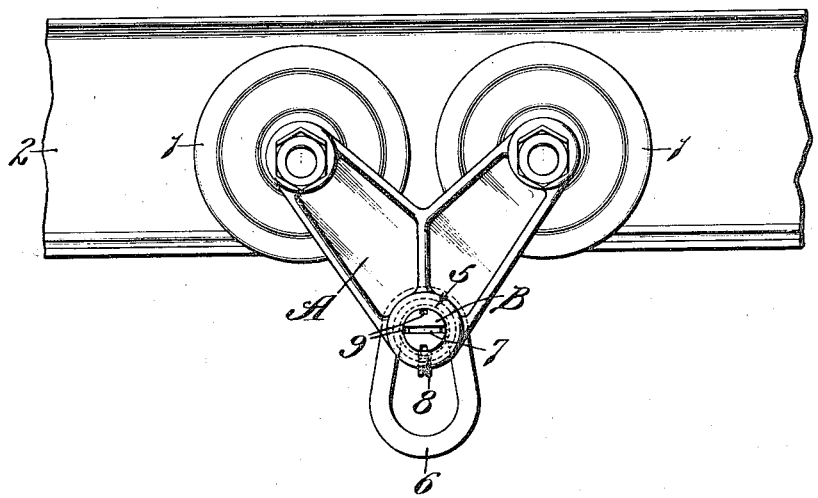
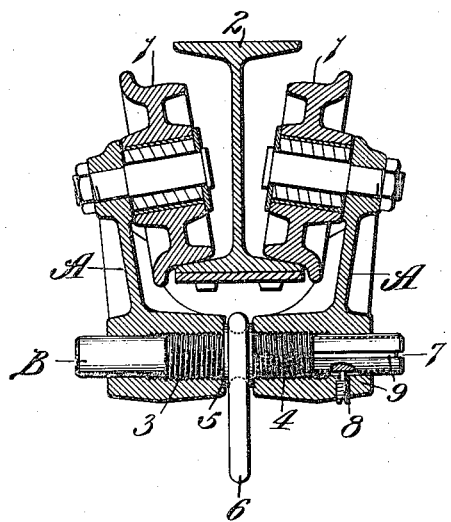

GEORGE F. STEEDMAN, OF ST. LOUIS, MISSOURI, ASSIGNOR TO CURTIS & COMPANY MANUFACTURING COMPANY, OF WELLSTON, MISSOURI, A CORPORATION OF MISSOURI.

TROLLEY.

1,151,226.    Specification of Letters Patent.    Patented Aug. 24, 1915.

Application filed June 21, 1915. Serial No. 35,315.

*To all whom it may concern:*

Be it known that I, GEORGE F. STEEDMAN, a citizen of the United States, residing at St. Louis, Missouri, have invented a certain new and useful Improvement in Trolleys, of which the following is a full, clear, and exact description, such as will enable others skilled in the art to which it appertains to make and use the same.

This invention relates to trolleys of the type that comprises two laterally-adjustable load-equalizing side frames provided with wheels that are adapted to travel on an overhead track, the track that is generally used with trolleys of this type being formed from an I-beam arranged edgewise so that the bottom flange of same will constitute a track on which the wheels of the trolley can travel.

The main object of my present invention is to provide a trolley of the type mentioned which is so designed that the side frames can be easily adjusted toward and away from each other without dismantling the trolley or without removing the trolley from the track.

Another object is to provide a quickly adjustable trolley which is so designed that the member from which the load is suspended will always remain properly centered or centrally located with respect to the side frames that carry the track wheels. And still another object is to provide an adjustable trolley of simple construction, which is so designed that there is no liability of the side frames moving accidentally from the position in which they have been adjusted.

Other objects and desirable features of my invention will be hereinafter pointed out.

Figure 1 of the drawings is a side elevational view of an adjustable trolley constructed in accordance with my invention. Fig. 2 is a vertical, cross-sectional view of the trolley shown in Fig. 1.

Referring to the drawings, which illustrate the preferred form of my invention, A designates the two side frames of the trolley which are provided with wheels 1 that are adapted to travel on an overhead track 2, the track herein shown consisting of an I-beam set edgewise so that the track wheels 1 can travel on the bottom flange of same. The side frames A are adjustably connected together by means of a shaft B that passes transversely through said side frames and which is provided with two oppositely-screw-threaded portions 3 and 4 that are arranged on opposite sides of an enlarged portion 5 at the center of the shaft B equipped with an annular groove for receiving a link or suitable device 6 from which the load on the trolley is suspended. One of the side frames A is provided with an internally-screw-threaded bore whose threads coöperate with the right-hand threads on the shaft B, and the other side frame is provided with an internally-screw-threaded bore whose threads coöperate with the left-hand threads on the shaft B. Consequently, when the shaft B is turned in one direction, both of the side frames A will move simultaneously away from each other, and when said shaft is turned in the opposite direction, both of the side frames will move simultaneously toward each other. The shaft B is formed in such a manner that it can be turned easily and means are employed for securely locking said shaft so as to prevent it from turning accidentally, and thus destroying the adjustment of the side frames. In the form of my invention herein shown the shaft B is provided at one end with a slot 7 in which a screw-driver or other suitable tool can be inserted when it is desired to turn the shaft, and one of the side frames is provided with a set screw 8 having a reduced end that is adapted to enter one of a plurality of longitudinal slots 9 in the shaft B, so as to securely lock said shaft in adjusted position. It will be obvious, however, that various other means could be employed for locking the shaft B in adjusted position and for enabling said shaft to be turned without departing from the spirit of my invention, which, broadly stated, consists in a trolley having side frames that are adjustably connected together by a shaft or pin provided with oppositely-screw-threaded portions, one of which coöperates with an internally-screw-threaded bore in one of the side frames and the other coöperating with an internally-screw-threaded bore in the other side frame.

A trolley of the construction above described can be adjusted quickly and easily to adapt it to different sized tracks, owing to the fact that the lateral adjustment of the two side frames A of the trolley is effected by simply turning the shaft B in one direction to increase the distance between the side frames and turning said shaft in the opposite direction to reduce the distance between the side frames. Such a design overcomes the necessity of dismantling the trolley or removing it from the track when it is desired to vary the distance between the track wheels. And still another desirable feature of such a trolley is that the link or device 6 on which the load is suspended always remains properly centered with respect to the track wheels, owing to the fact that both side frames always move at the same speed and the same relative distance when the shaft B is turned, as said elements are positively connected together by two coöperating sets of right-hand and left-hand screw threads.

Having thus described my invention, what I claim, and desire to secure by Letters Patent, is:

1. A trolley provided with two side frames that are equipped with track wheels, and a connecting means for said side frames consisting of a shaft passing transversely through the side frames and provided with oppositely-screw-threaded portions, one of which coöperates with screw threads on one side frame and the other coöperating with screw threads on the other side frame.

2. A trolley provided with two side frames that are equipped with track wheels, a connecting means for said side frames consisting of a shaft passing transversely through the side frames and provided with oppositely-screw-threaded portions, one of which coöperates with screw threads on one side frame and the other coöperating with screw threads on the other side frame, and means for preventing said shaft from turning accidentally.

3. A trolley, comprising side frames equipped with track wheels, a connecting means for said side frames consisting of a rotatable element that passes transversely through said side frames, and coöperating means on said element and said frames for causing the side frames to separate when said element is turned in one direction and to move toward each other when said element is turned in the opposite direction.

4. A trolley, comprising side frames equipped with track wheels, a load-suspending device arranged centrally between said side frames, a rotatable connecting element that joins said side frames together, and means for causing said side frames to move at the same speed and the same relative distance toward and away from said load-suspending device when said connecting element is turned in one direction or the other.

5. A trolley, comprising a pair of side frames equipped with track wheels, a load-suspending means arranged centrally between said track wheels, and a rotatable connecting device that joins said side frames together and which is so constructed that said side frames can be adjusted laterally toward and away from each other without liability of destroying the central arrangement of said load-suspending means, by simply turning said connecting device in one direction or the other.

6. A trolley, comprising side frames equipped with track wheels, a connecting shaft passing transversely through said side frames and provided with a right-hand, screw-threaded portion that coöperates with screw threads on one of the side frames and also provided with a left-hand, screw-threaded portion that coöperates with screw threads on the other side frame, a load-suspending means arranged on said shaft between the oppositely-screw-threaded portions of same, and a locking device on one of said side frames that is adapted to engage said shaft and lock it in adjusted position.

7. A trolley, comprising side frames equipped with track wheels, a connecting shaft passing transversely through said side frames and provided with a right-hand, screw-threaded portion that coöperates with screw threads on one of the side frames and also provided with a left-hand screw-threaded portion that coöperates with screw threads on the other side frame, a load-suspending means arranged on said shaft between the oppositely-screw-threaded portions of same, said shaft being provided at one end with a plurality of longitudinally-extending grooves, a set screw in one of said side frames that coöperates with said grooves to hold said shaft in adjusted position, and means on said shaft for enabling it to be turned.

8. A trolley, comprising side frames equipped with track wheels, a connecting shaft passing through said side frames, right and left-hand screw threads on said connecting shaft arranged to engage in right and left-hand screw threads in the respective side frames, a load-carrying link seated in a central seat on said shaft, and a locking means in one side frame to hold the cross shaft against turning in that frame.

In testimony whereof I hereunto affix my signature in the presence of two witnesses, this 14th day of June 1915.

GEORGE F. STEEDMAN.

Witnesses:
D. M. BALL,
W. A. YAEGER.